(12) United States Patent
Helou, Jr. et al.

(10) Patent No.: US 8,087,921 B2
(45) Date of Patent: Jan. 3, 2012

(54) EXTRUSION MOLD AND METHOD OF USE

(75) Inventors: Elie Helou, Jr., Santa Barbara, CA (US); David Dellinger, Santa Barbara, CA (US)

(73) Assignee: Biosphere Holdings Corporation, Carpinteria, CA (US)

( * ) Notice: Subject to any disclaimer, the term of this patent is extended or adjusted under 35 U.S.C. 154(b) by 896 days.

(21) Appl. No.: 11/648,129

(22) Filed: Dec. 28, 2006

(65) Prior Publication Data

US 2007/0202228 A1    Aug. 30, 2007

Related U.S. Application Data

(63) Continuation-in-part of application No. 10/608,441, filed on Jun. 27, 2003, now Pat. No. 7,481,645, and a continuation-in-part of application No. 10/928,602, filed on Aug. 26, 2004, now Pat. No. 7,553,363.

(60) Provisional application No. 60/498,129, filed on Aug. 26, 2003, provisional application No. 60/498,396, filed on Aug. 27, 2003.

(51) Int. Cl.
  *B29C 47/00* (2006.01)
(52) U.S. Cl. ......... 425/376.1; 425/812; 366/75
(58) Field of Classification Search ......... 425/130, 425/131.1, 376.1, 812; 366/75
See application file for complete search history.

(56) References Cited

U.S. PATENT DOCUMENTS

| | | |
|---|---|---|
| 1,875,482 A | 9/1932 | Nanna |
| 2,488,189 A * | 11/1949 | Hanson ......... 366/77 |
| 3,031,030 A * | 4/1962 | Rodenacker ......... 96/196 |
| 3,169,272 A * | 2/1965 | Maxson ......... 425/377 |
| 3,772,076 A | 11/1973 | Keim |
| 4,491,417 A * | 1/1985 | Hold et al. ......... 366/75 |
| 4,545,752 A | 10/1985 | Hanamoto et al. |
| 4,639,341 A | 1/1987 | Hanamoto et al. |
| 4,900,242 A | 2/1990 | Maus et al. |
| 5,100,586 A | 3/1992 | Jennings et al. |
| 5,169,566 A | 12/1992 | Stucky et al. |
| 5,205,863 A | 4/1993 | Elion et al. |
| 5,209,880 A | 5/1993 | Miwa |
| 5,232,496 A | 8/1993 | Jennings et al. |
| 5,352,111 A | 10/1994 | Selback |

(Continued)

FOREIGN PATENT DOCUMENTS

EP    0752209 A1    1/1997

(Continued)

OTHER PUBLICATIONS

United States Patent & Trademark Office; International Search Report and Written Opinion for PCT Application No. PCT/US07/88989, mailed Apr. 18, 2008.

(Continued)

*Primary Examiner* — Joseph Del Sole
*Assistant Examiner* — James Sanders
(74) *Attorney, Agent, or Firm* — Perkins Coie LLP

(57) ABSTRACT

In one embodiment of the invention a mold system and method of use are provided such that aqueous starch-based compositions and baked goods articles that use the conversion of water to steam may be produced using an extruder that allows the venting of such gases and/or steam. The extruder is vented in such a way as to allow steam to escape, but retain the composition until the exit end.

13 Claims, 5 Drawing Sheets

U.S. PATENT DOCUMENTS

| | | |
|---|---|---|
| 5,354,621 A | 10/1994 | Liebermann |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,412,005 A | 5/1995 | Bastioli et al. |
| 5,453,310 A | 9/1995 | Andersen et al. |
| 5,506,046 A | 4/1996 | Andersen et al. |
| 5,508,072 A | 4/1996 | Andersen et al. |
| 5,514,430 A | 5/1996 | Andersen et al. |
| 5,523,293 A | 6/1996 | Jane et al. |
| 5,527,387 A | 6/1996 | Andersen et al. |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,580,409 A | 12/1996 | Andersen et al. |
| 5,580,624 A | 12/1996 | Andersen et al. |
| 5,582,670 A | 12/1996 | Andersen et al. |
| 5,614,307 A | 3/1997 | Andersen et al. |
| 5,618,341 A | 4/1997 | Anderson et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,654,048 A | 8/1997 | Andersen et al. |
| 5,658,603 A | 8/1997 | Andersen et al. |
| 5,658,624 A | 8/1997 | Anderson et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Anderson et al. |
| 5,665,152 A | 9/1997 | Bassi et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Anderson et al. |
| 5,679,381 A | 10/1997 | Andersen et al. |
| 5,683,772 A | 11/1997 | Andersen et al. |
| 5,691,014 A | 11/1997 | Andersen et al. |
| 5,693,355 A | 12/1997 | Haas |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,913 A | 2/1998 | Andersen et al. |
| 5,736,209 A | 4/1998 | Andersen et al. |
| 5,738,921 A | 4/1998 | Andersen et al. |
| 5,753,308 A | 5/1998 | Andersen et al. |
| 5,766,525 A | 6/1998 | Andersen et al. |
| 5,776,388 A | 7/1998 | Andersen et al. |
| 5,783,126 A | 7/1998 | Andersen et al. |
| 5,783,240 A | 7/1998 | Wenger et al. |
| 5,786,080 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,851,634 A | 12/1998 | Andersen et al. |
| 5,868,824 A | 2/1999 | Andersen et al. |
| 5,928,741 A | 7/1999 | Andersen et al. |
| 5,973,082 A | 10/1999 | Elmore |
| 5,976,235 A | 11/1999 | Andersen et al. |
| 6,030,673 A | 2/2000 | Andersen et al. |
| 6,083,586 A | 7/2000 | Andersen et al. |
| 6,090,195 A | 7/2000 | Andersen et al. |
| 6,146,573 A | 11/2000 | Shogren et al. |
| 6,158,883 A * | 12/2000 | Hepke ............................ 366/75 |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,214,399 B1 | 4/2001 | Garbo |
| 6,220,849 B1 | 4/2001 | Atake |
| 6,228,898 B1 | 5/2001 | Nakanishi |
| 6,231,970 B1 | 5/2001 | Andersen et al. |
| 6,240,836 B1 | 6/2001 | Garbo |
| 6,277,899 B1 | 8/2001 | Bastioli et al. |
| 6,347,934 B1 | 2/2002 | Andersen et al. |
| 6,379,446 B1 | 4/2002 | Andersen et al. |
| 6,413,069 B2 | 7/2002 | Oono et al. |
| 6,494,704 B1 | 12/2002 | Andersen et al. |
| 6,585,859 B1 | 7/2003 | Hakansson |
| 6,589,327 B1 | 7/2003 | Snidow |
| 6,846,573 B2 | 1/2005 | Seydel |
| 6,878,199 B2 | 4/2005 | Bowden et al. |
| 7,004,616 B2 * | 2/2006 | Murakami et al. .............. 366/75 |
| 7,083,673 B2 | 8/2006 | Bowden et al. |
| 7,196,124 B2 | 3/2007 | Parker et al. |
| 2003/0047110 A1 | 3/2003 | Poovarodom et al. |
| 2003/0143417 A1 | 7/2003 | Kesselring et al. |
| 2003/0216492 A1 | 11/2003 | Bowden et al. |
| 2004/0265453 A1 | 12/2004 | Helou, Jr. et al. |
| 2005/0089606 A1 | 4/2005 | Dellinger et al. |
| 2006/0057319 A1 | 3/2006 | Gleich et al. |
| 2006/0075544 A1 | 4/2006 | Kriesel et al. |
| 2006/0110498 A1 | 5/2006 | Dellinger et al. |
| 2007/0021534 A1 | 1/2007 | Glenn et al. |

FOREIGN PATENT DOCUMENTS

| | | |
|---|---|---|
| EP | 0880896 A1 | 12/1998 |
| JP | 57-110150 | 7/1982 |
| JP | 09-028274 | 4/1997 |
| JP | 10-245792 | 9/1998 |
| JP | 11-222794 | 8/1999 |
| WO | 92/10938 A1 | 7/1992 |
| WO | 99/45073 A | 9/1999 |
| WO | 00/39215 A | 7/2000 |
| WO | 2005021633 | 10/2005 |

OTHER PUBLICATIONS

European Patent Office; Supplemental Search Report for European Patent Application No. 04755659.2, mailed Jul. 28, 2008.

International Search Report for International Application No. PCT/US04/19619 dated Nov. 27, 2006 (5 pages).

International Search Report for International Application No. PCT/US04/27824 dated Feb. 20, 2007 (4 pages).

International Search Report for International Application No. PCT/US06/42800 dated May 2, 2007 (2 pages).

Ducey, et al., "Alkaline Sizing Applications Surge Ahead." Alkaline Paper Advocate, Oct. 1996.

European Patent Office, Supplemental Search Report for EP 04782322, dated Jun. 10, 2009.

European Patent Office, Examination Report for EP 04782322, dated Sep. 23, 2009.

European Patent Office, Examination Report for EP 04755659, dated Jun. 17, 2009.

European Patent Office, Supplemental Search Report for EP 06827369, dated Oct. 7, 2009.

Japanese Patent Office, Translation of the Office Action issued for JP Application 2003-517440, dated Dec. 2, 2008.

Hagenmaeir, Robert D. et al., "Wax Microemulsions and Emulsions as Citrus Coatings," J. Agric. Food Chem., 42, 1994, 899-902.

United States Patent and Trademark Office; International Search Report and Written Opinion for International Patent Application No. PCT/US08/69266, mailed Oct. 2, 2008.

Japanese Patent Office, English translation of Dec. 8, 2009 Office Action for Japanese Patent Application No. 2006-524867.

* cited by examiner a
TUBE CONFIGURATION b
ROD CONFIGURATION

EXTRUSION MOLD AND METHOD OF USE

CROSS-REFERENCE TO RELATED APPLICATIONS

This application is a continuation-in-part of U.S. patent application Ser. No. 10/608,441 filed Jun. 27, 2003 now U.S. Pat. No. 7,481,645, entitled "Method for Use in Baking Articles of Manufacture and Mold for Use in Said Method," and U.S. patent application Ser. No. 10/928,602 filed Aug. 26, 2004, entitled "Composition for Use in Biodegradable Articles and Method of Use," which claims the benefit of U.S. Provisional Patent Application No. 60/498,129 filed Aug. 26, 2003, entitled Provisional Patent Application No. 60/498,396 filed Aug. 27, 2003, entitled "Mix Formulation for Use in Biodegradable Articles and Method of Use." The entirety of each of these applications is incorporated herein by reference.

FIELD OF THE INVENTION

The present invention relates generally to systems and methods for creating extruded products while venting steam and/or gases during the extrusion process.

BACKGROUND OF THE INVENTION

The pressure to use biodegradable disposable packaging has been steadily increasing in the last decade. As recently as March, 2003, Taiwan has outlawed the use of Styrofoam in disposable packaging. Even China's major cities such as Beijing and Shanghai have outlawed the use of Styrofoam materials in disposable packaging. Various attempts have been made in the prior art to manufacture starch based disposables for use in food service items such as trays, plates, and bowls. Some methods include producing starch based packaging that has materials vented in excess of the final product as can be evidenced when one inspects the finished product. However, these technologies use male and female molds and not extrusion dies. Attempts to extrude starch do not include venting during the extrusion process, and instead include injection gases in an attempt to foam the starch.

Further, the majority of the existing extrusion processes using starch are geared towards producing thick sheeted materials that are then bonded together to form packaging materials that replace thick Styrofoam. Examples are protective packaging for shipping television sets or other similar electronic or heavy systems. Unfortunately, existing efforts have not been successful for producing articles such as toilet paper rolls, chop sticks, or straws primarily due to the inability to reduce pressures during the baking-extrusion process.

Accordingly, there is a need for improved systems and methods for extruding materials while continually venting gases during the extrusion process without any substantial material losses.

SUMMARY OF THE INVENTION

In one embodiment of the present invention a method of extruding a material is provided comprising the steps of providing an extrusion head having a plurality of venting gaps for venting a gas; providing an extrusion mixture comprising fibers and water to the extrusion head; extruding the mixture through the extrusion head wherein the step of extruding comprises heating the mixture within the extrusion head such that the gas is released from the mixture; venting the gas from the extrusion head through the plurality of venting gaps such that the remaining mixture is substantially retained by the extrusion head.

In another embodiment, an extrusion head is provided comprising a plurality of venting gaps, wherein the venting gaps are dimensioned to allow for the venting of a gas but substantial retention of the remaining material to be extruded during extrusion and wherein the venting gaps are both radial and axial and the extrusion head is multi-piece.

BRIEF DESCRIPTION OF THE DRAWINGS

In order to fully understand the manner in which the above-recited details and other advantages and objects of the invention are obtained, a more detailed description of the invention will be rendered by reference to specific embodiments thereof which are illustrated in the included drawings. Understanding that these drawings depict only typical embodiments of the invention and are not therefore to be considered as limiting of its scope, the invention will be described and explained with additional specificity and detail through the use of accompanying drawings in which.

DETAILED DESCRIPTION

The following description of the invention is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein.

In an embodiment of the present invention, the characteristics of baked goods are used to provide high efficiency systems and methods for extruding starch-based articles as well as similar behavior materials. The systems and methods of the present embodiment accomplish the ability to extrude thin and thick walled extrusions that could not previously be produced due to the inability to vent gases during the extrusion process.

Figure 1:
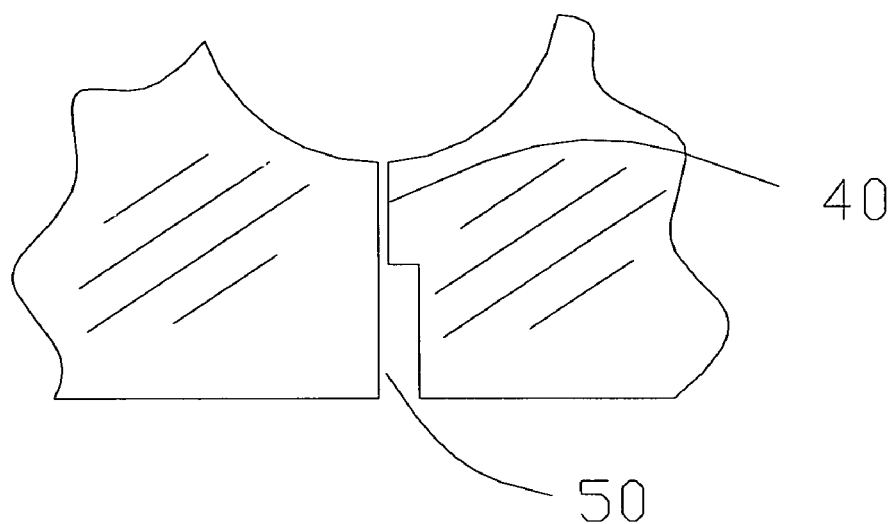
FIG. 1 is a view of a basic venting feature of an embodiment of the present invention.
Figure 2:
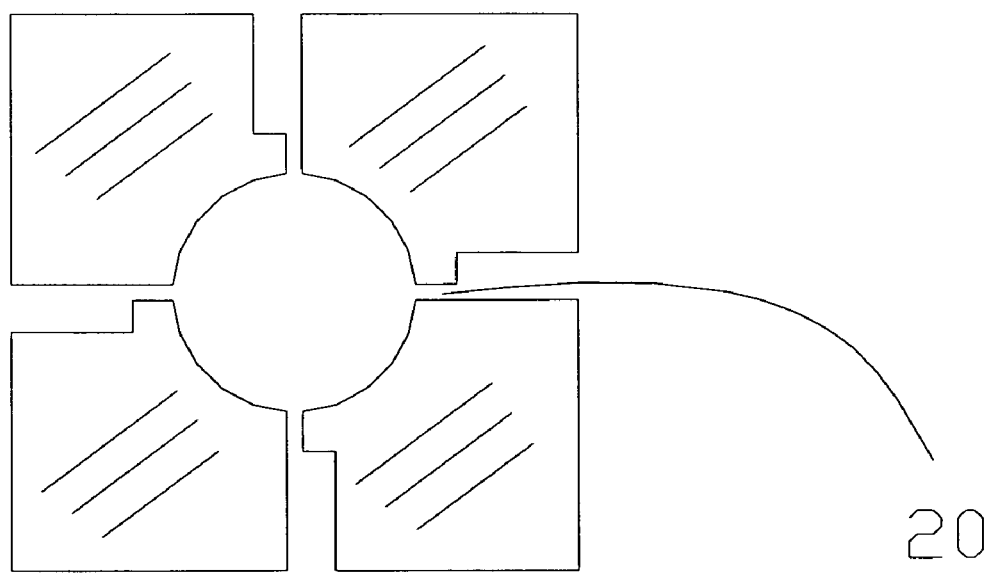
FIG. 2 is a view of a cross section of an extruder head of an embodiment of the present invention.
Figure 3:
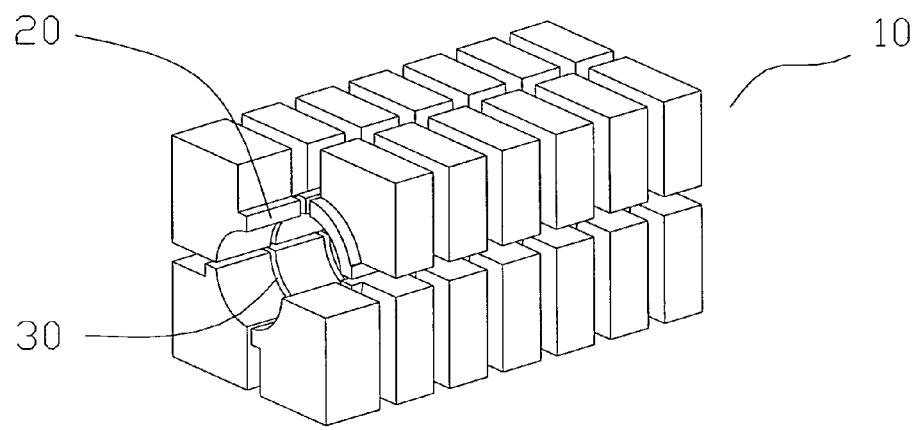
FIG. 3 is a perspective view of a venting feature applied in an axial and trans-axial fashion to the extruder head of an embodiment of the present invention.

In the present embodiment, vents may be added within an extrusion tunnel, axially and/or through a cross section. Thus, referring to FIGS. 1-3, one embodiment of the inventive systems comprises a multi-piece extrusion head 10. The extrusion head 10 comprises one or more axial venting gaps 20 and/or radial venting gaps 30 that extend along the mating perimeter of the different pieces of the extrusion head 10. The size of the venting gaps 20, 30 can be constant or vary and are preferably from between about 0.001" to about 0.006" to allow steam and/or other gases to escape during the extrusion process, but contain the material to be extruded. The extrusion head 10 may also comprise venting gaps 20, 30 along the axis of the extrusion as well as radially between multiple pieces that are then attached together or may comprise only axial venting gaps 20 or only radial venting gaps 30.

In one aspect of the present embodiment the composition to be extruded can be water, alcohol or other liquid based. The composition may or may not contain additives such as fibers to improve the properties of the composition.

According to another embodiment of the invention, during the extrusion process, fibers can be chopped up and mixed in an extrusion mixture or fibers can be continuous and pulled through as is performed in composite pulltrusions. For pulltrusions, the fibers are pulled through a material flow opening of the extruder and are baked directly into the starch mixture. This can form a very axially strong product since the fibers are continuous.

According to another embodiment of the invention, the fibers can be knitted together to form different shapes that are then pulled through the extruder and baked into the starch. This method allows for biaxially strong extrusions. It also allows the user to customize required strength solutions by producing a fiber matrix that is then baked into the starch matrix.

According to another embodiment of the invention, the addition of a center mandrel with or without venting features on this mandrel and heated or unheated which would allow for the formation of tupes such as paper roll centers, toilet paper centers, and straws.

One feature of some embodiments of the invention is that the number of venting gaps can be customized, i.e., increased or reduced in numbers or size, to better control the steam and gas release process. It is important to note that not only round shapes but squares, rectangles, octagonal, namely, any cross-section that can be extruded, could be developed for this process. As previously mentioned, the addition of center mandrels could help in forming tube like sections instead of purely solid shapes.

Methods according to some embodiments of the invention generally comprise the steps of mixing at least water and starch together to form a starch-based composition then extruding the composition through the special die heads. The heat starts to bake the starch which in turn forms a skin wherever it comes into contact with the heated extruder surfaces. In addition, the heat turns the water in the composition to steam which is allowed to escape via the venting features. The mixture can have premixed fibers in it or continuous fibers that can also be stitched together or weaved in a shape to improve the overall strength of the finished product.

These and other features of embodiments of the present invention will become more fully apparent from the following description and appended claims, or may be learned by the practice of the invention as set forth hereinafter.

In another embodiment of the present invention mold systems and methods of use are provided such that aqueous starch-based compositions and baked goods articles that use the conversion of water to steam may be produced using an extruder that allows the venting of such gases and/or steam. The extruder is vented in such a way as to allow steam to escape, but retain the composition until the exit end.

More particularly, some embodiments use the physical property of starch and other baked goods to allow the release of steam without releasing the composition. When the mixture first contacts the heated surfaces of the extruder, they form a skin and the water in the mixture starts to turn to steam. This method of allowing the venting of the steam at multiple areas along the extrusion path allows for more dense products that can withstand much higher forces. By adding steam release gaps using the several different methods describes herein, the baking time can be reduced thus increasing output.

By methods of the present embodiment one may produce tube and other extruded shapes that would be cheaper than existing paper and plastic products. Moreover, the overall process tends to be relatively benign and does not use the harsh chemicals normally associated with paper or plastic products.

In another embodiment of the present invention, the above extrusion concept may be applied to any material that can be placed in a cavity which when exposed to the heated surface produces a skin that is semi-permeable to the liquid being turned to gas and is not limited to aqueous based mixtures. Moreover, the mixtures can be edible or non-edible and could include various components for modifying the properties of the mixture, such as the addition of scents or other materials.

Figure 4:
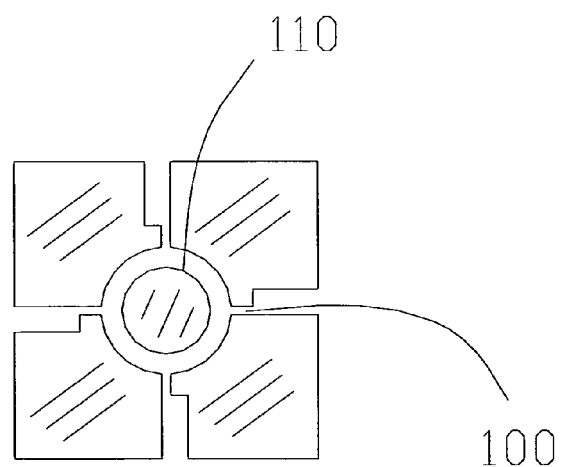
FIG. 4 is a cross section view of an extruder head of an embodiment of the present invention with a venting features with a center mandrel used to allow the formation of tube shapes.

Referring to FIG. 4, a cross-section of an extruder head having venting gaps 100 and an inner mandrel 110 that would be used for tube structure manufacturing is shown.

Figure 5:
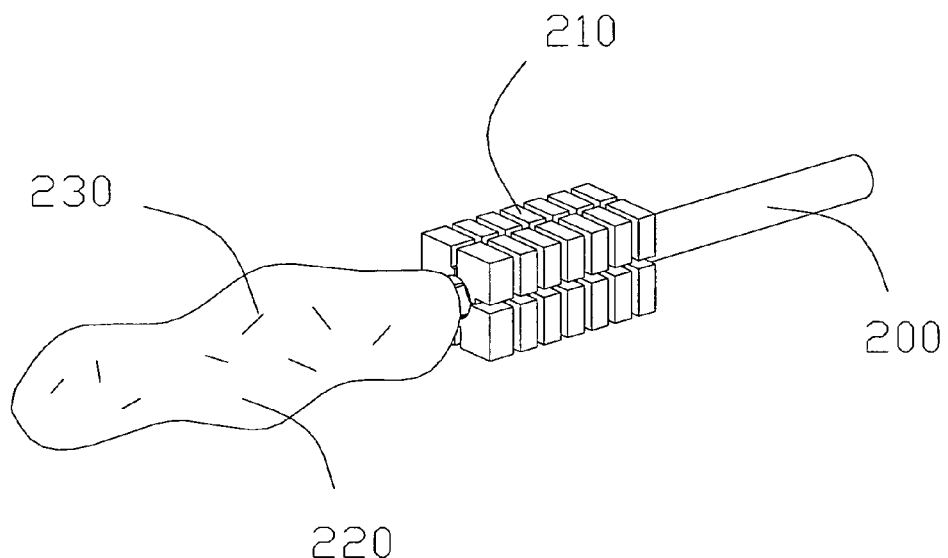
FIG. 5 is a perspective view of an extruder head of an embodiment of the present invention showing a mix with or without fibers going through the extruder and exiting formed on the other end.

Referring to FIG. 5, a trimetric view showing the extrusion of a tube structure 200 through an extruder head 210 from mix 220 with fiber 230.

Figure 6:
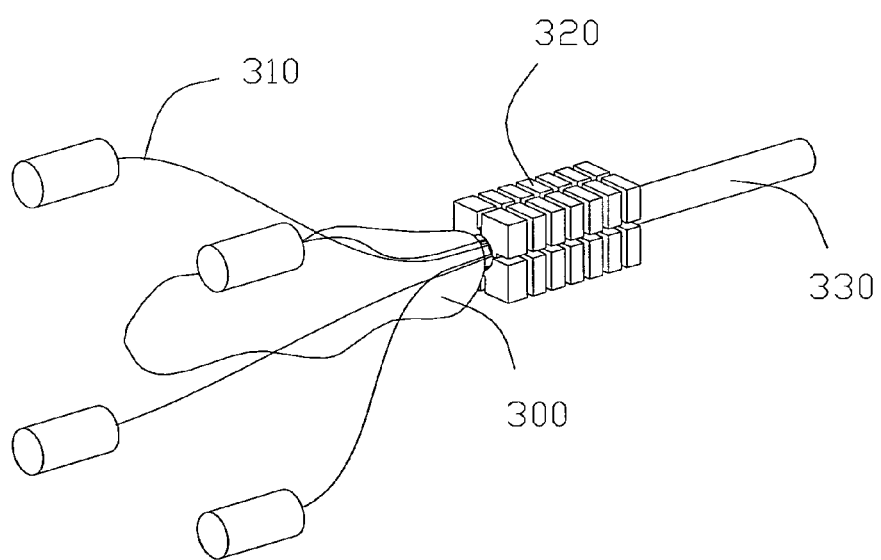
FIG. 6 is a perspective view of an extruder head of an embodiment of the present invention showing continuous fibers and mix being introduced to the extruder and exiting formed on the other end.
Figure 7:
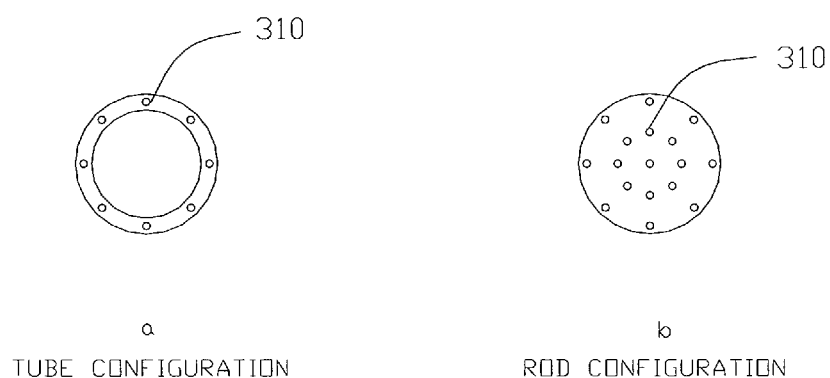
FIG. 7 is a cross section view of a formed product of an embodiment of the present invention with continuous fibers in a relatively straight configuration in a tube and rod configuration.

Referring to FIG. 6, a trimetric view showing a mix 300 and continuous fibers 310 being introduced to the extruder head 320 to produce an extrusion 330. Referring to FIG. 7a, a cross section of the extrusion 330 is shown demonstrating fiber 310 orientations for a tube extrusion, and referring to FIG. 7b, a cross section of the extrusion 330 is shown demonstrating fiber 310 orientations for a rod configuration. As can been seen in FIGS. 7a and 7b, the fiber 310 is oriented along the length of the tube or rod.

Figure 8:
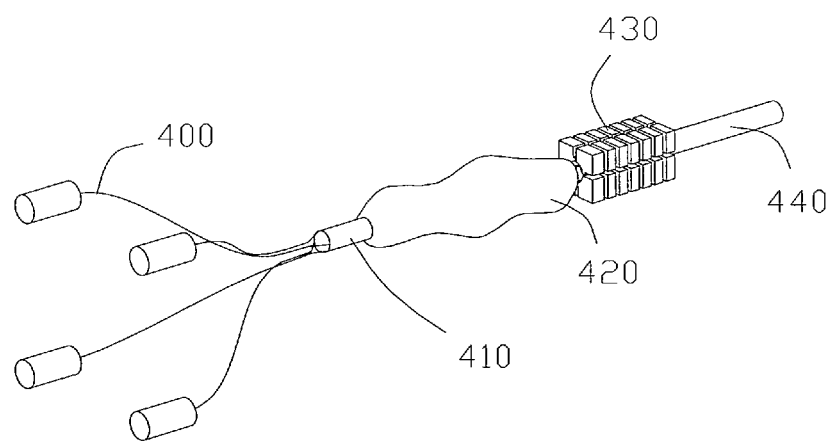
FIG. 8 is a perspective view of the extruder of an embodiment of the present invention being fed fibers that are braided or knitted then introduced into the opening along with the starch mixture.

Referring to FIG. 8, a continuous fiber 400 being knitted into a general cohesive shape 410 is shown being inserted into a mix 420 which is then extruded through the extruder head 430 to form the extrusion 440.

Figure 9:
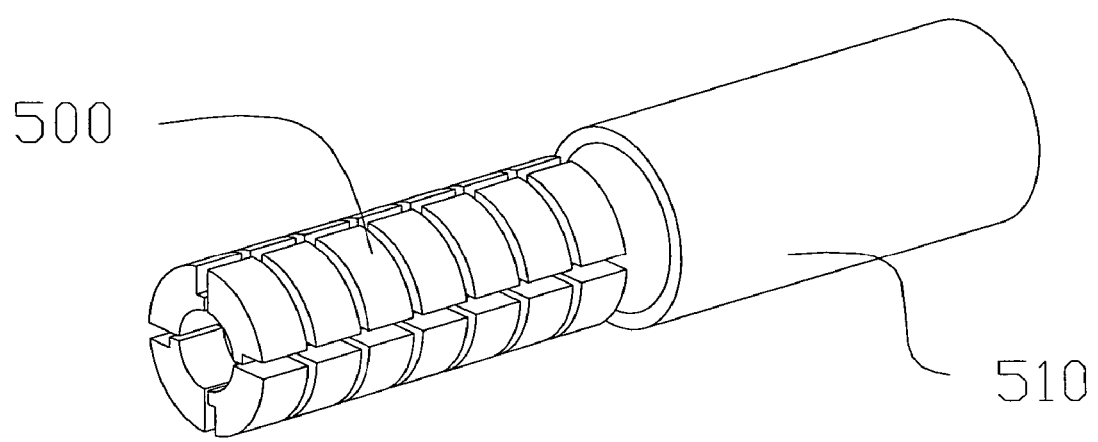
FIG. 9 is a perspective exploded view of the various pieces of an embodiment of the present invention that are designed in such a way as they fit into an outer sleeve that would hold them together but still allow venting of the steam or gases.

Referring to FIG. 9, a trimetric view of an extruder head 500 that may be inserted into a pipe 510 or similar to hold the individual pieces of the extruder head together is shown.

As stated above, the foregoing is merely intended to illustrate various embodiments of the present invention. The specific modifications discussed above are not to be construed as limitations on the scope of the invention. It will be apparent to one skilled in the art that various equivalents, changes, and modifications may be made without departing from the scope of the invention, and it is understood that such equivalent embodiments are to be included herein. All references cited herein are incorporated by reference as if fully set forth herein.

What is claimed is:

1. An extrusion head comprising:
a multi-piece extrusion head comprising at least two pieces, wherein the at least two pieces define at least a portion of an inner cavity that extends the length of the multi-piece extrusion head;
an material inlet on a first side of the multi-piece extrusion head and a material outlet on a second side of the multi-piece extrusion head;
a first axial venting gap, wherein the first axial venting gap is dimensioned to allow for the venting of a gas but substantial retention of the material to be extruded during extrusion, the first axial venting gap comprising a first portion extending in a substantially continuous manner along the length of the multi-piece extrusion head and in fluid communication with the inner cavity, and a second portion in direct fluid communication with the first portion, wherein the second portion is wider than the first portion; and
wherein at least a portion of the first axial venting gap is formed at a first intersection of at least two pieces of the multi-piece extrusion head.

2. The extrusion head of claim 1 further comprising a plurality of axial venting gaps.

3. The extrusion head of claim 2 further comprising a radial venting gap.

4. The extrusion head of claim 2 wherein the plurality of axial venting gaps comprises the first axial venting gap and at least a second axial venting gap, the second axial venting gap comprising a first portion extending in a substantially continuous manner along the length of the extrusion head and in fluid communication with the inner cavity, and a second portion in direct fluid communication with the first portion, wherein the second portion is wider than the first portion.

5. The extrusion head of claim 4 wherein the at least a portion of the second axial venting gap is formed at a second intersection of at least two pieces of the multi-piece extrusion head.

6. An extrusion head comprising:
a multi-piece extrusion head comprising at least two pieces, wherein the at least two pieces define at least a portion of an inner cavity that extends the length of the multi-piece extrusion head;
a first radial venting gap, wherein the first radial venting gap is dimensioned to allow for the venting of a gas but substantial retention of the material to be extruded during extrusion, the first radial venting gap comprising a first portion extending in a substantially continuous manner along a circumference of the inner cavity of the multi-piece extrusion head and in direct fluid communication with the inner cavity, and a second portion in direct fluid communication with the first portion, wherein the second portion is wider than the first portion; and wherein at least a portion of the first radial venting gap is formed at a first intersection of at least two pieces of the multi-piece extrusion head.

7. The extrusion head of claim 6 further comprising a second radial venting gap.

8. The extrusion head of claim 7 wherein the second radial venting gap is dimensioned to allow for the venting of a gas but substantial retention of the material to be extruded during extrusion, the second radial venting gap comprising a first portion extending in a substantially continuous manner along a circumference of the inner cavity of the extrusion head and in direct fluid communication with the inner cavity, and a second portion in direct fluid communication with the first portion, wherein the second portion is wider than the first portion.

9. The extrusion head of claim 8 wherein at least a portion of the second radial venting gap is formed at a second intersection of at least two pieces of the multi-piece extrusion head.

10. An extrusion head comprising:
a multi-piece extrusion head comprising at least two pieces, wherein the at least two pieces define at least a portion of an inner cavity that extends the length of the multi-piece extrusion head;
a first axial venting gap, wherein the first axial venting gap is dimensioned to allow for the venting of a gas but substantial retention of the material to be extruded during extrusion, the first axial venting gap comprising a first portion extending in a substantially continuous manner along the length of the multi-piece extrusion head and in fluid communication with the inner cavity, and a second portion in direct fluid communication with the first portion, wherein the second portion is wider than the first portion; and
a first radial venting gap, wherein the first radial venting gap is dimensioned to allow for the venting of a gas but substantial retention of the material to be extruded during extrusion, the first radial venting gap comprising a first portion extending in a substantially continuous manner along a circumference of the inner cavity of the multi-piece extrusion head and in direct fluid communication with the inner cavity, and a second portion in direct fluid communication with the first portion, wherein the second portion is wider than the first portion, and
wherein at least a portion of the first axial or radial venting gap is formed at a first intersection of at least two pieces of the multi-piece extrusion head.

11. The extrusion head of claim 10 wherein the first axial venting gap is formed at a first intersection of at least two pieces of the multi-piece extrusion head and the first radial venting gap is formed at a second intersection of at least two pieces of the multi-piece extrusion head.

12. The extrusion head of claim 10 further comprising at least a second axial venting gap and at least a second radial venting gap.

13. The extrusion head of claim 11 further comprising at least a second axial venting gap and at least a second radial venting gap.

* * * * *